Feb. 26, 1929.
F. M. COWGILL
1,703,478
AUXILIARY BRAKE RIGGING SUPPORT
Filed June 2, 1927
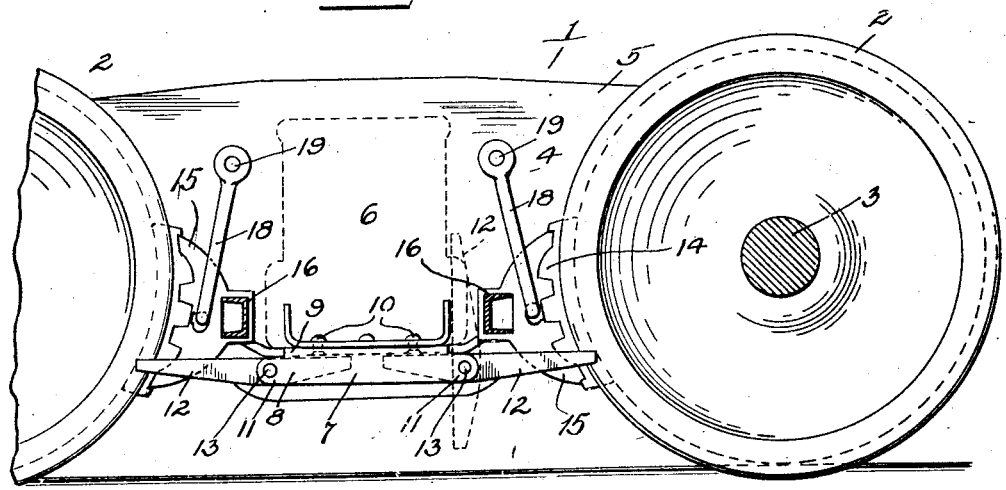
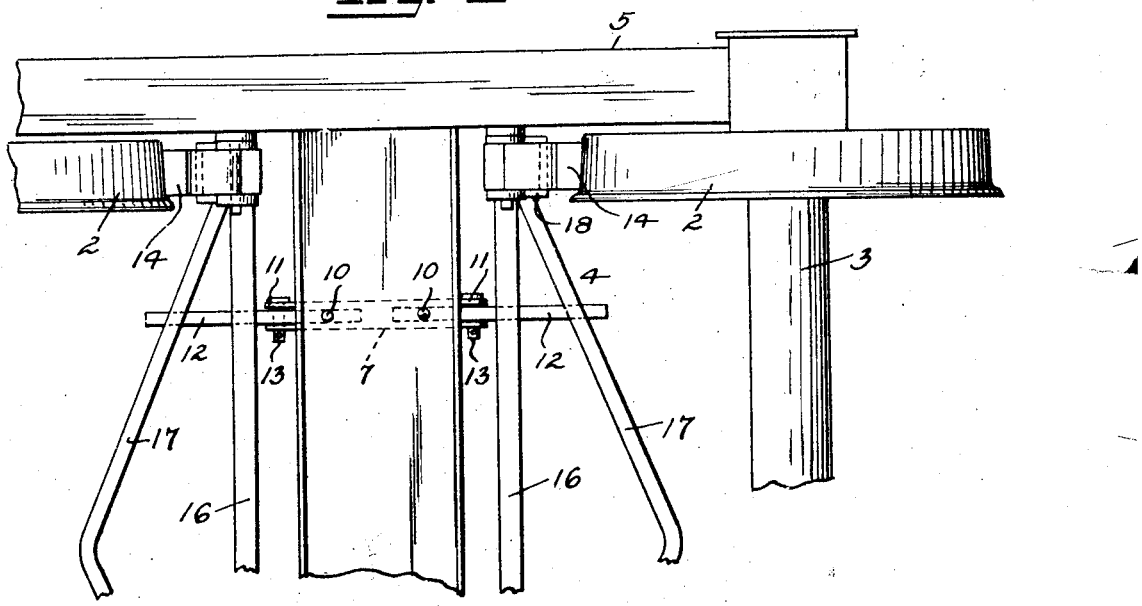
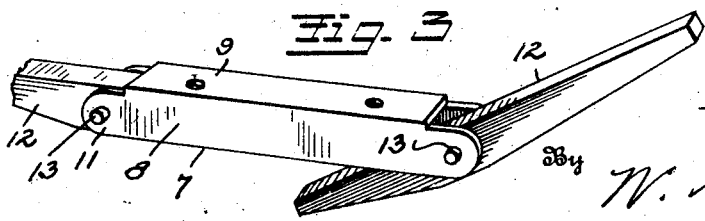
Inventor
F. M. Cowgill
By W. S. McDowell
Attorney Patented Feb. 26, 1929.

1,703,478

UNITED STATES PATENT OFFICE.

FRANK M. COWGILL, OF COLUMBUS, OHIO.

AUXILIARY BRAKE-RIGGING SUPPORT.

Application filed June 2, 1927. Serial No. 195,923.

This invention relates to improvements in brake rigging of the type employed in connection with railroad cars and other rolling stock, and is particularly directed to the provision of an improved auxiliary support or safety device adapted for use in connection with such brake rigging for the purpose of effecting the support of the latter in the event that the main supporting means should become broken, unfastened or inoperative for any other reason, the said auxiliary support serving in such event to support the brake rigging in a position above the track bed or rails, preventing the brake rigging from dropping and assuming positions which might wreck or derail the rolling stock.

An outstanding object of the invention is, therefore, to provide a simple and improved auxiliary support or safety device adapted to be carried in connection with a railroad car and so constructed and positioned as to prevent the brake beam, brake rigging or other associated structure from dropping on the rails in case of failure of the ordinary means of fastening or support.

A further object of the invention resides in so constructing the auxiliary support or safety device as to provide for the convenient removal of the brake beam and other associated structure without necessitating the removal of the auxiliary support or safety device from the car in order to facilitate the making of repairs and adjustments and to minimize the time required in doing so.

Heretofore in the construction of safety appliances of this character the construction has been such that in order to remove the brake rigging from the auxiliary supporting devices it has been necessary to remove such devices from their connected or mounted positions upon the car. This operation ordinarily has required considerable time and has resulted frequently in the failure of the repairmen to restore such appliances to their proper positions following the making of repairs, or in the failure to properly replace the safety appliances after they have been removed from the car. In the present invention cognizance has been taken of this condition and my improved auxiliary support is so constructed that it becomes a permanent part of the truck structure and need not be disturbed or taken off when a defective brake rigging is removed, my said auxiliary support being provided with a plurality of pivoted arms which, when normally positioned, are located beneath the brake rigging in order to support the latter in the event of failure on the part of the main supporting beam, but when it is desired to remove such defective brake rigging from the truck, the said arms are capable of assuming a folded or inactive position out of the way of the brake rigging so as to allow the latter to be withdrawn without interference from the truck.

With these and other objects in view as will appear as the description proceeds, the invention consists in the novel features of construction, combinations of elements and arrangements of parts hereinafter to be more fully described and pointed out in the appended claims.

In the accompanying drawings:

Figure 1 is a vertical longitudinal sectional view taken through a railroad truck, and showing more particularly the brake rigging and the improved auxiliary support and safety appliance comprising the present invention, Figure 2 is a plan view of the brake rigging and the auxiliary supporting device, Figure 3 is a detail perspective view of the auxiliary support.

Referring more particularly to the accompanying drawings the numeral 1 designates generally the truck of a railroad or other equivalent type of car. Inasmuch as the truck is of standard construction and design the same may be described generally as consisting of the usual wheels 2, connecting axles 3, brake riggings 4 and frame members 5. All of these parts are of conventional form and operation and, therefore, a more detailed description thereof has been omitted.

Connected with the side frames 5 of the truck is the usual transversely extending spring base or plank 6 to which is riveted along the under side thereof a pair of transversely spaced U shaped supports 7. In the preferred form of the invention these supports are stamped or pressed from a metallic plate of suitable thickness, and includes spaced sides 8 and a top 9, the latter being riveted or otherwise secured as at 10 to the lower portion of the spring base 6.

The supports 7 terminate at the opposite ends thereof in bifurcations 11, which terminate beyond the planes of the side walls of the supporting base 6. Pivotally mounted in connection with the furcations 11 are pivotally movable supporting arms 12. These arms are pivoted to the supports 7 intermediately of the length thereof as at 13 and when normally positioned the said arms occupy horizontal planes, with the shorter ends thereof in engagement with the undersides of the tops 9 of the supports 7, and with the longer portions of said arms projecting below the brake rigging 4, so as to be in a position to sustain the weight of the brake rigging in the event of failure on the part of the principal supporting means for said brake rigging.

The brake rigging 4 is of standard construction and consists of the usual brake shoes 14 arranged for engagement with the treads of the wheels 2. These brake shoes are carried, as usual, by the heads 15, and these heads are connected by transversely disposed channel members 16 and the usual cooperating stay rods 17. The rods 17 are supported by the customary swinging arms 18, which have their upper ends pivoted as at 19 in connection with the frame structure of the truck. Through the operation of the usual brake mechanism, not shown, the brake rigging may be oscillated back and forth into and out of engagement with the treads of the wheels 2 to apply or release brake pressures.

In view of the above it will be seen that when the arms 12 occupy their normal positions, shown in full lines in Figure 1, the same will be horizontally located with the inner or shorter ends thereof disposed in engagement with the supporting brackets 7, the longer ends of said arms being arranged immediately beneath but out of engagement with the brake riggings 4. In the event the supporting means for the brake rigging should become broken, the said brake rigging will drop upon and will be supported by the arm 12 in a relatively elevated position above the track bed. To remove the injured brake rigging to facilitate repair thereof, the arms 12 are turned to assume the vertical position, shown by dotted lines in Figure 1 by raising the brake rigging to a height sufficient to permit the arm 12 to clear the channel member 16. This enables the brake rigging to be dropped and readily withdrawn from the truck and appropriate repairs made. It will be noted that this may be accomplished without removing the safety appliances from the truck, as has been the case heretofore, and thereby a considerable saving in time is effected without sacrifice of safety.

What is claimed is:

1. In a car truck, the combination with the spring base of said truck, of a brake rigging, a pair of transversely spaced brackets carried by said spring base, and an arm pivotally connected with each of said brackets for swinging movement about horizontal axis, the swinging movement of each arm in a downward direction being limited by the engagement of one end of said arm with said bracket, whereby said arms may occupy horizontal positions below said brake rigging.

2. In a car truck, the combination with the spring base of said truck, of a brake rigging, a pair of brackets secured to said spring base in transversely spaced relationship, a pair of auxiliary supporting arms, and horizontal pivotal connections between the intermediate portions of said arms and said brackets.

3. In a car truck, the combination with the spring base of said truck of a brake rigging, a pair of transversely spaced channel members carried by said spring base, an arm pivotally connected with each end of each of said channel members, said arms being pivoted to said channel members at a point intermediate their lengths and adapted to swing about a horizontal axis, the swinging movement of each arm in a downward direction being limited by the engagement of one end of said arm with said channel whereby said arms may occupy horizontal positions below said brake rigging.

In testimony whereof I affix my signature.

FRANK M. COWGILL.